(12) United States Patent
Inoue

(10) Patent No.: US 8,330,815 B2
(45) Date of Patent: Dec. 11, 2012

(54) VEHICLE-MOUNTED CAMERA SYSTEM

(75) Inventor: Masayuki Inoue, Yokkaichi (JP)

(73) Assignees: Autonet Works Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 1433 days.

(21) Appl. No.: 11/886,166

(22) PCT Filed: Mar. 24, 2006

(86) PCT No.: PCT/JP2006/305960
§ 371 (c)(1),
(2), (4) Date: Sep. 12, 2007

(87) PCT Pub. No.: WO2006/114962
PCT Pub. Date: Nov. 2, 2006

(65) Prior Publication Data
US 2008/0278581 A1 Nov. 13, 2008

(30) Foreign Application Priority Data
Apr. 20, 2005 (JP) ................................ 2005-122331

(51) Int. Cl.
*H04N 9/47* (2006.01)
(52) U.S. Cl. ......... 348/148; 396/448; 359/601; 359/611
(58) Field of Classification Search .................. 348/148
See application file for complete search history.

(56) References Cited

U.S. PATENT DOCUMENTS

| 4,012,748 | A | * | 3/1977 | Lemanski | 396/337 |
|---|---|---|---|---|---|
| 5,745,803 | A | * | 4/1998 | Ito | 396/83 |
| 6,323,934 | B1 | * | 11/2001 | Enomoto | 355/40 |
| 6,476,855 | B1 | | 11/2002 | Yamamoto | |
| 7,253,833 | B2 | * | 8/2007 | Imoto | 348/148 |
| 2003/0095182 | A1 | * | 5/2003 | Imoto | 348/148 |
| 2004/0046889 | A1 | | 3/2004 | Imoto | |
| 2006/0104627 | A1 | * | 5/2006 | Park | 396/234 |

FOREIGN PATENT DOCUMENTS

DE 199 23 964 A1 12/1999
(Continued)

OTHER PUBLICATIONS

E.P. Patent Publication No. 0957634 A2 to Sogawa et al. ("Sogawa").*

(Continued)

*Primary Examiner* — Tonia L Dollinger
*Assistant Examiner* — June Sison
(74) *Attorney, Agent, or Firm* — Oliff & Berridge, PLC.

(57) ABSTRACT

The present invention has an object to provide a vehicle-mounted camera system capable of preventing the occurrence of only a smear in an area without a mask image on a picked up image, and substantially reducing a ghost and stray light. The vehicle-mounted camera system according to the present invention includes an imaging element (30a), an imaging lens (30c) disposed in front of the imaging element (30a), a superimposing means for superimposing a mask image on part of a picked up image of the imaging element (30a), and a light-shielding part (31b) arranged in a range corresponding to the mask image within the angle of view of the imaging lens (30c) for shielding part of incident light from the exterior.

5 Claims, 5 Drawing Sheets

FOREIGN PATENT DOCUMENTS

| | | |
|---|---|---|
| DE | 102 53 378 A1 | 6/2003 |
| JP | U-61-094823 | 6/1986 |
| JP | A-6-105194 | 4/1994 |
| JP | A-06-148721 | 5/1994 |
| JP | U-06-036042 | 5/1994 |
| JP | A-08-146490 | 6/1996 |
| JP | A-11-338074 | 12/1999 |
| JP | A 2003-78787 | 3/2003 |
| JP | A-2003-78787 | 3/2003 |
| JP | A 2003-207836 | 7/2003 |
| JP | A-2003-333396 | 11/2003 |
| JP | A 2004-104476 | 4/2004 |
| JP | A 2006-65086 | 3/2006 |

OTHER PUBLICATIONS

Matsuoka; "About Video Q and A", *Videosalon*, Dec. 2001, vol. 42, pp. 134-137(with partial English-language translation).

Japanese Office Action in Japanese Patent Application No. 2007-514501; dated May 28, 2010 (with English-language translation).

Jan. 28, 2010 Office Action issued in German Patent Application No. 11 2006 000 936.2-31 (with translation).

Japanese Office Action issued in Japanese Patent Application No. 2007-514501 on Mar. 2, 2010 (with English-language translation).

* cited by examiner

F I G . 1
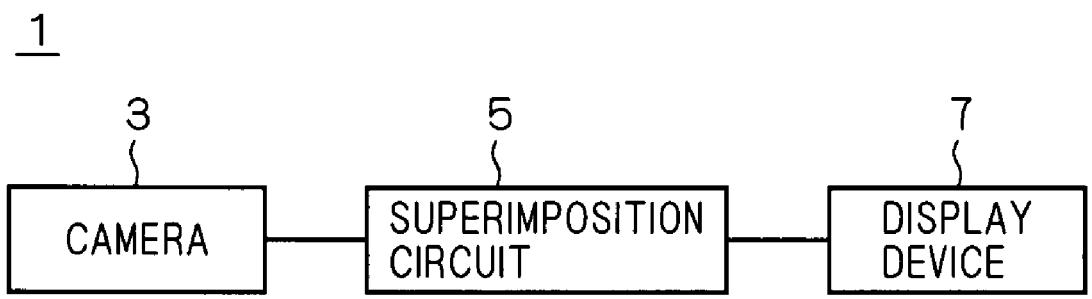

F I G . 5
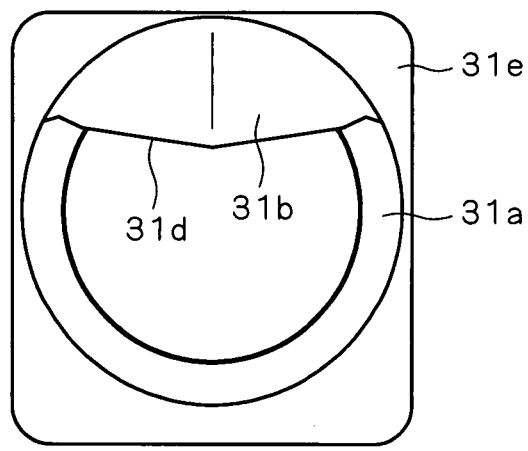
F I G . 6
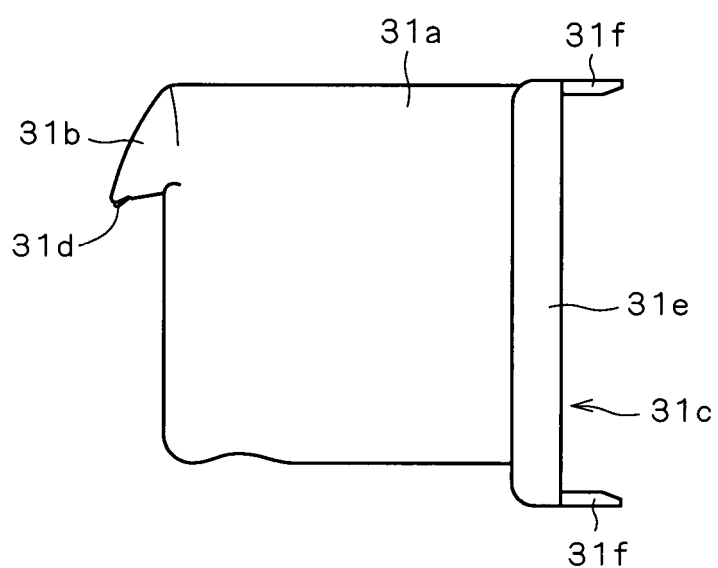

VEHICLE-MOUNTED CAMERA SYSTEM

TECHNICAL FIELD

The present invention relates to vehicle-mounted camera systems mounted on vehicles for imaging the surroundings of the vehicles.

BACKGROUND ART

For camera systems in which a camera images a dead angle in the surroundings of a vehicle and the picked up image is displayed on a display screen inside the car, methods of displaying a picked up image with various screen designs are being studied so that a driver can instinctively understand a sense of direction and a sense of distance on the picked up image displayed on the display screen.

In one of those screen designs, a mask image is superimposed on part of a picked up image so that that part of the picked up image is not displayed on a display screen. When an imaging element inside a camera receives high-luminance light such as the sun or a headlight of an oncoming vehicle, this type of screen design can prevent the light reflected on a picked up image from being displayed on a display screen by the mask image.

Typically, when an imaging element receives high-luminance light, an image of the light is reflected and a smear occurs due to that light on its picked up image. The mask image only hides the image of the light and cannot hide the smear due to the light in the screen design mentioned above. Thus when an area corresponding to the mask image in the imaging element receives high-luminance light, the display screen displays a strange image where the image of the high-luminance light is not reflected but only the smear has occurred.

The above camera systems have another disadvantage of reflecting a ghost or stray light on a picked up image when the imaging element receives external light from outside the angle of view.

DISCLOSURE OF INVENTION

Therefore, the present invention has an object to provide a vehicle-mounted camera system capable of preventing the occurrence of only a smear in an area without a mask image on a picked up image, and substantially reducing a ghost and stray light.

To solve the aforementioned problems, in a first aspect of a vehicle-mounted camera system according to the present invention, the system comprises: an imaging element; an imaging lens disposed in front of the imaging element; a displaying means including a display screen displaying a picked up image picked up by the imaging element; a superimposing means for superimposing the picked up image and a mask image displayed on part of the display screen; and a light-shielding member shielding part of light which enters the imaging lens, wherein the light-shielding member is arranged to appear in an area displaying the mask image on the display screen.

In a second aspect of the vehicle-mounted camera system according to the present invention, particularly in the first aspect, the mask image is superimposed on an upper area of the picked up image, and the light-shielding member is arranged in an upper area of the angle of view of the imaging lens.

According to the first aspect of the vehicle-mounted camera system of the present invention, because the light-shielding member is arranged to appear in an area displaying the mask image on the display screen, (1) the light-shielding member can be secured as large as possible while keeping the member from appearing on the picked up image, (2) high-luminance light which enters the range corresponding to the mask image within the angle of view can be shielded so as not to be received by the imaging element, thus preventing the occurrence of only a smear in an area without the mask image on the picked up image, and (3) the light-shielding member, which is arranged within the angle of view of the imaging lens, can be formed over a large area, to substantially shield incident light from outside the angle of view, thus substantially reducing a ghost and stray light.

According to the second aspect of the vehicle-mounted camera system of the present invention, because the mask image is superimposed on the upper area of the picked up image, and the light-shielding member is arranged in the upper area of the angle of view of the imaging lens, external light (high-luminance incident light, or incident light that causes a ghost and stray light) which enters the upper area of the angle of view of the imaging lens can be shielded appropriately.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a general view of the structure of a vehicle-mounted camera system according to a preferred embodiment of the present invention.

FIG. 5 is a front view of the lens cover.

FIG. 6 is a side view of the lens cover.

BEST MODE FOR CARRYING OUT THE INVENTION

FIG. 1 is a general view of the structure of a vehicle-mounted camera system according to a preferred embodiment of the present invention.

Figure 3:
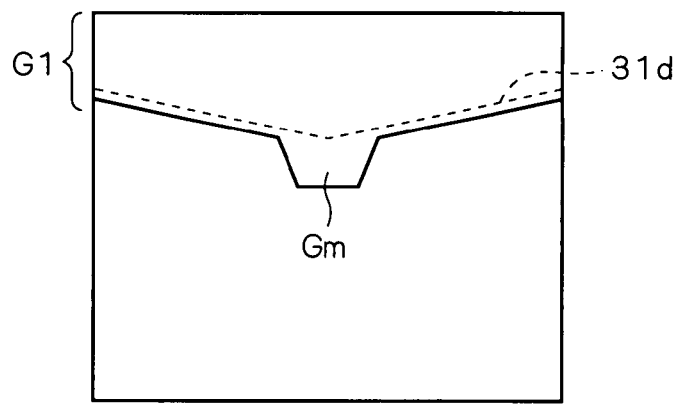
FIG. 3 illustrates an example of a picked up image on which a mask image is superimposed.
Figure 4:
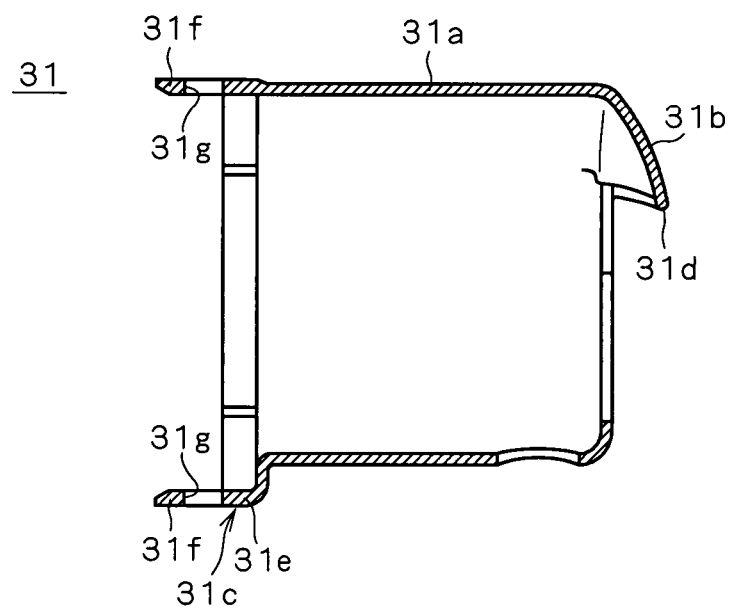
FIG. 4 is a cross-sectional view of FIG. 2 taken along the line IV-IV (side cross-sectional view of a lens cover).
Figure 7:
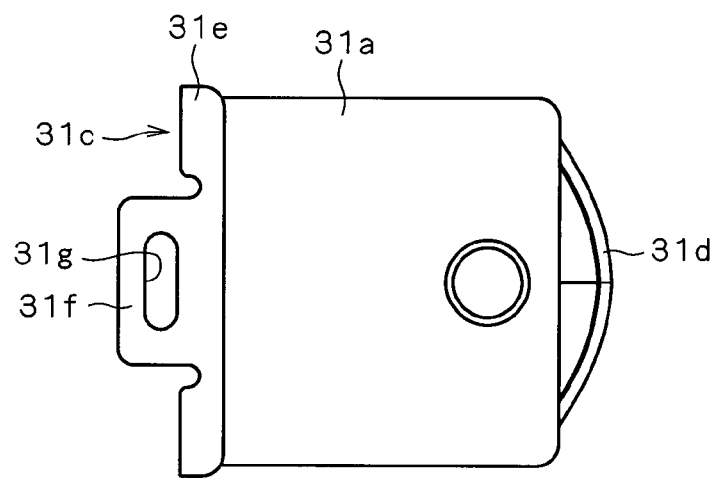
FIG. 7 is a bottom view of the lens cover.
Figure 8:
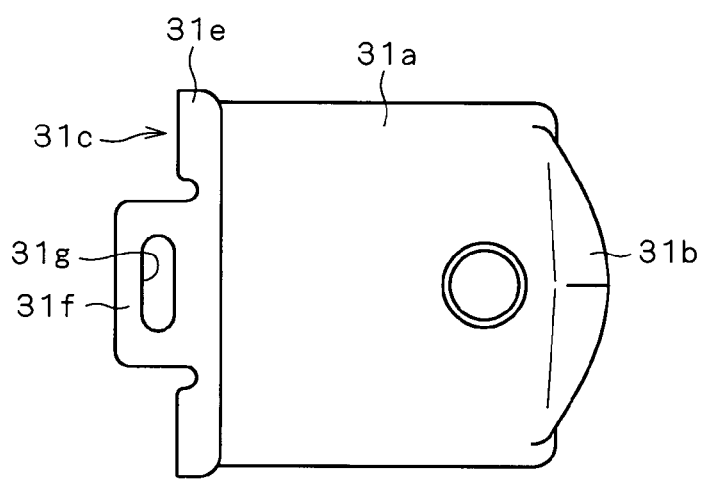
FIG. 8 is a top view of the lens cover.

As shown in FIG. 1, this vehicle-mounted camera system 1 includes a camera (imaging means) 3 mounted on a vehicle for imaging the surroundings of the vehicle, a superimposition circuit (superimposing means) 5 for superimposing a mask image Gm on part (e.g. an upper area G1 of a picked up image G shown in FIG. 3) of the picked up image G of the camera 3, and a display device 7 installed on the vehicle for displaying the picked up image G processed by the superimposition circuit 5.

Figure 2:
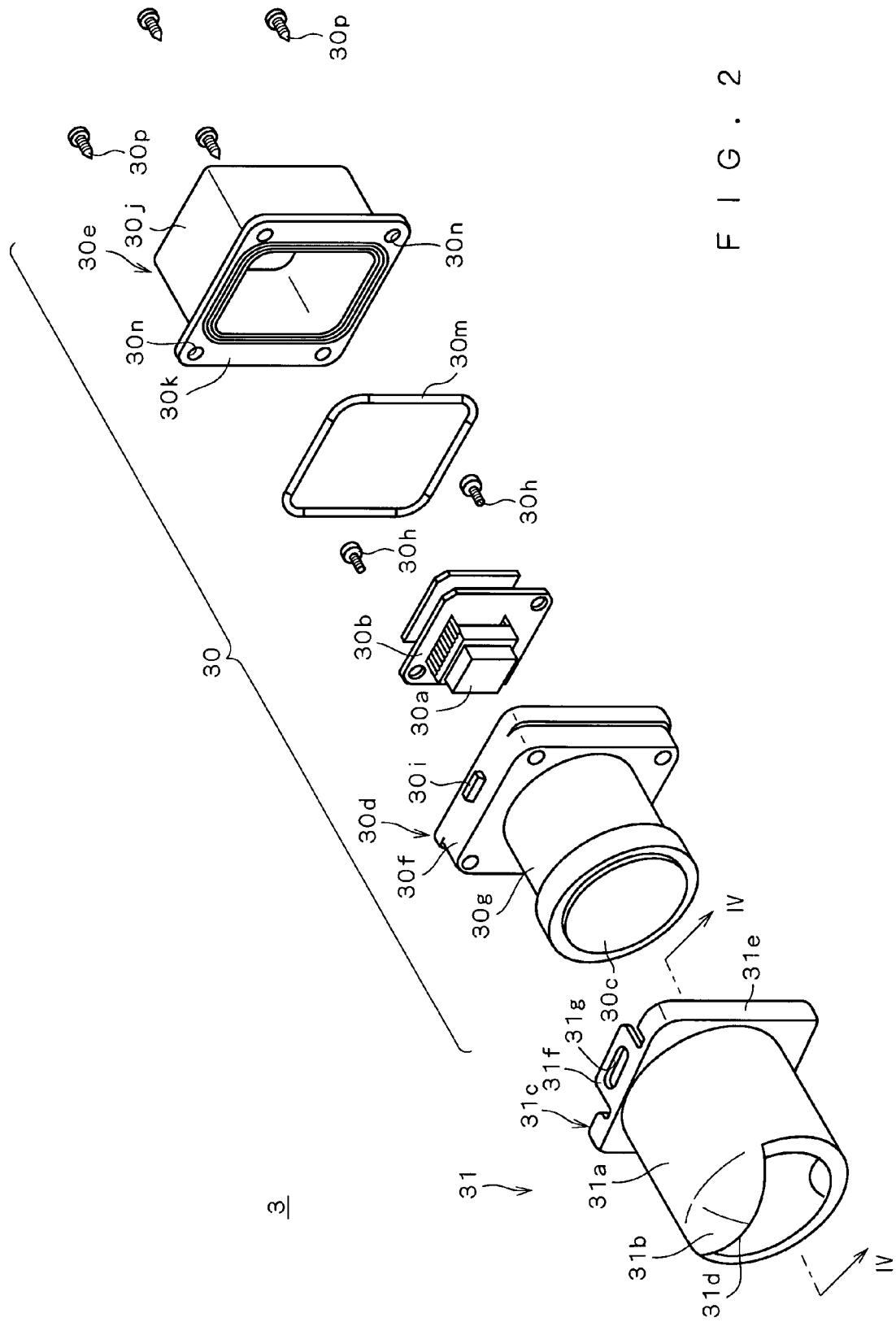
FIG. 2 is a disassembled perspective view of a camera.

The camera 3 includes a camera body 30 and a lens cover 31 mounted on the camera body 30, as shown in FIG. 2.

The camera body 30 includes a circuit substrate 30b having an imaging element 30a mounted thereon, an imaging lens 30c disposed in front of the imaging element 30a, a front case 30d housing the circuit substrate 30b while holding the imaging lens 30c, and a rear case 30e. The front case 30d includes a cylindrical holder part 30g at the front of a box-shaped case part 30f with an open rear surface, for example, the holder part 30g being provided to communicate with the inside of the case part 30f. The case part 30f houses the circuit substrate 30b fixed therein by screws 30h, for example, and the holder part 30g holds the imaging lens 30c. In addition, engagement protrusions 30i are formed on side surfaces (upper side surface and lower side surface in this case) of the case part 30f of the front case 30d. The rear case 30e includes a flange part 30k provided on the periphery of the front of a box-shaped case part 30j with an open front surface, for example. The rear case 30e has its open front surface butt-joined to the open rear surface of the front case 30d via a sealing material 30m with screws 30p placed through holes 30n of the flange part 30k, to be fixed to the front case 30d by the screws 30p.

As shown in FIGS. 4 to 8, for example, the lens cover 31 includes a cylindrical part 31a to be mounted on the holder part 30g of the front case 30d, with a light-shielding part (light-shielding member) 31b provided in part of a front-end opening of the cylindrical part 31a, and an engagement part 31c for engaging the front case 30d provided on a rear-end opening of the cylindrical part 31a.

The light-shielding part 31b is formed to cover part (upper peripheral area in this case) of the periphery of an opening surface of the front-end opening of the cylindrical part 31a, and is formed to project toward the front at the side of its peripheral end 31d which is identical to the mask image Gm in shape. That is, the light-shielding part 31b is arranged in a range corresponding to the mask image Gm within the angle of view of the imaging lens 30c, with the lens cover 31 being mounted on the front case 30d as described later, to shield part of incident light from the exterior.

The engagement part 31c includes a fitting part 31e that fits to the first half of the case part 30f of the front case 30d, with engagement pieces 31f extending toward the rear from side surface portions (upper side surface portion and lower side surface portion in this case) of the fitting part 31e. Each of the engagement pieces 31f is provided with an engagement hole 31g that engages the engagement protrusion 30i of the front case 30d.

The lens cover 31 thus formed is mounted on the camera 3 with the holder part 30g of the front case 30d housed and arranged in its cylindrical part 31a, and the first half of the case part 30f of the front case 30d fitting into its fitting part 31e. In this mounting state, the light-shielding part 31b of the lens cover 31 is arranged in the range corresponding to the mask image Gm within the angle of view of the imaging lens 30c, and the engagement holes 31g of the engagement pieces 31f of the lens cover 31 engage the engagement protrusions 30i of the camera 3, to fix the lens cover 31 to the camera 3.

In the vehicle-mounted camera system 1 thus configured, the picked up image G of the camera 3 has the mask image Gm superimposed on part (e.g. the upper area G1 of the picked up image G shown in FIG. 3) thereof by the superimposition circuit 5, to be displayed on the display device 7. At this time, out of incident light which enters the angle of view of the imaging lens 30c, incident light which enters the range corresponding to the mask image Gm is shielded by the light-shielding part 31b of the lens cover 31 and thus is not received by the imaging element 30a, and only incident light which enters a range not corresponding to the mask image Gm is received by the imaging element 30a via the imaging lens 30c, to image the picked up image G. The result is that the area corresponding to the mask image Gm on an imaging surface of the imaging element 30a does not receive much of incident light from the exterior (high-luminance incident light), which prevents the occurrence of only a smear in an area without the mask image Gm on the picked up image G. Further, as incident light from outside the angle of view is substantially shielded by the light-shielding part 31b of the lens cover 31, the imaging element 30a does not receive incident light that causes stray light or a ghost, which prevents the occurrence of stray light or a ghost on the picked up image G.

According to the vehicle-mounted camera system 1 thus configured, because the light-shielding part 31b is arranged in the range corresponding to the mask image Gm within the angle of view of the imaging lens 30c in its camera 3, (1) the light-shielding part 31b can be secured as large as possible while keeping the part 31b from appearing on the picked up image G, (2) high-luminance light which enters the range corresponding to the mask image Gm within the angle of view can be shielded so as not to be received by the imaging element 30a, thus preventing the occurrence of only a smear in an area without the mask image Gm on the picked up image G, and (3) the light-shielding part 31b, which is arranged within the angle of view of the imaging lens 30c, can be formed over a large area, to substantially shield incident light from outside the angle of view, thus substantially reducing a ghost and stray light.

Further, since the light-shielding part 31b is formed to project toward the front at the side of its peripheral end 31d, unnecessary exterior light can be shielded efficiently by shielding as much incident light from the front as possible.

Moreover, because the mask image Gm is superimposed on the upper area G1 of the picked up image G, and the light-shielding part 31b is arranged in the upper area G1 of the angle of view of the imaging lens 30c, external light (high-luminance incident light, or incident light that causes a ghost and stray light) which enters the upper area G1 of the angle of view of the imaging lens 30c can be shielded appropriately.

Although the light-shielding part 31b is arranged in the upper peripheral area on the front-end opening surface of the lens cover 31 (namely, the upper area within the angle of view of the imaging lens 30c) in this embodiment because the mask image Gm is superimposed on the upper area G1 of the picked up image G, the arrangement position of the light-shielding part 31b may be determined depending on the superimposition position of the mask image Gm. When the mask image Gm is superimposed on a lower area of the picked up image G, for example, the light-shielding part 31b may be arranged in a lower peripheral area on the front-end opening surface of the lens cover 31 (namely, the lower area within the angle of view of the imaging lens 30c).

While the invention has been shown and described in detail, the foregoing description is in all aspects illustrative and not restrictive. It is therefore understood that numerous modifications and variations can be devised without departing from the scope of the invention.

The invention claimed is:

1. A vehicle-mounted camera system comprising:
an imaging element;
an imaging lens disposed in front of said imaging element;
a display element that displays an image picked up by said imaging element;
a superimposing element that superimposes said picked up image and a mask image displayed on part of said display element; and
a hood-shaped light-shielding member having a first section that extends along a first axis that is substantially perpendicular to a plane defined by the imaging lens and a second section that extends along a second axis that is substantially parallel to the plane defined by the imaging lens, the hood-shaped light-shielding member shielding part of light from entering said imaging lens, wherein said hood-shaped light-shielding member is arranged to appear in an area displaying said mask image on said display element.

2. The vehicle-mounted camera system according to claim 1, wherein said mask image is superimposed on an upper area of said picked up image, and said hood-shaped light-shielding member is arranged in an upper area of an angle of view of said imaging lens.

3. The vehicle-mounted camera system according to claim 1, wherein the display element is a display screen.

4. The vehicle-mounted camera system according to claim 1, wherein said hood-shaped light-shielding member is arranged in a range corresponding to said mask image within an angle of view of said imaging lens such that said mask image on said display element appears in an area to be displayed.

5. A vehicle-mounted camera system comprising:
an imaging element;
an imaging lens disposed in front of said imaging element;
a display element that displays an image picked up by said imaging element;
a superimposing element that superimposes said picked up image and a mask image displayed on part of said display element; and
a hood-shaped light-shielding member having a first section that extends along a first axis that is substantially perpendicular to a plane defined by the imaging lens and a second section that extends along a second axis that is substantially parallel to the plane defined by the imaging lens, the hood-shaped light-shielding member shielding part of light from entering said imaging lens, wherein said hood-shaped light-shielding member: i) is arranged in an area within an angle of view of said imaging lens, ii) is formed so as to project toward a front of said imaging lens at the side of a peripheral end thereof, and iii) is arranged to appear in an area displaying said mask image on said display element.

* * * * *